Figure 1:
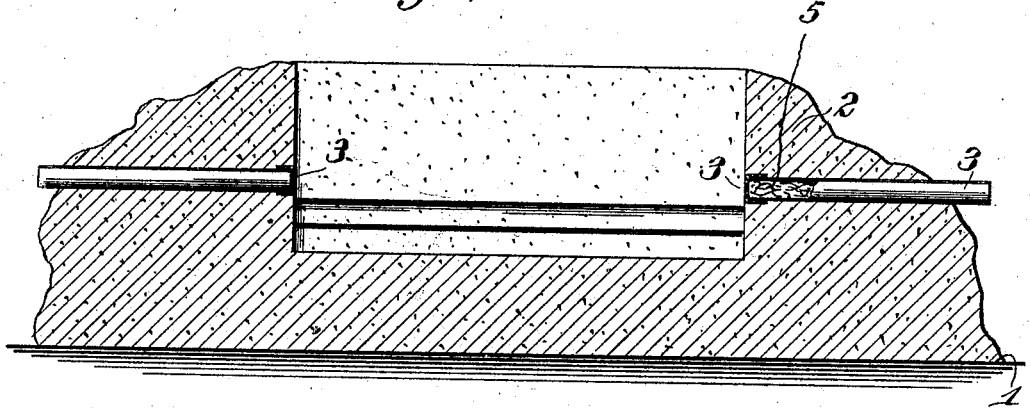

No. 805,962. PATENTED NOV. 28, 1905.
J. M. HUTCHINSON.
MOLD FOR ARTIFICIAL STONE.
APPLICATION FILED APR. 8, 1905.

WITNESSES:

INVENTOR
James M. Hutchinson
BY
HIS ATTORNEYS

UNITED STATES PATENT OFFICE.

JAMES M. HUTCHINSON, OF NEW YORK, N. Y., ASSIGNOR TO D. HOWARD HAYWOOD, TRUSTEE, OF NEW YORK, N. Y.

MOLD FOR ARTIFICIAL STONE.

No. 805,962.    Specification of Letters Patent.    Patented Nov. 28, 1905.

Application filed April 3, 1905. Serial No. 254,460.

*To all whom it may concern:*

Be it known that I, JAMES M. HUTCHINSON, a citizen of the United States of America, and a resident of the city, county, and State of New York, have invented certain new and useful Improvements in Molds for Artificial Stone, of which the following is a specification, reference being had to the accompanying drawings, forming a part thereof.

My invention relates to improvements in molds for the casting of artificial stone; and it consists in a mold composed of a plastic material substantially impervious to water and provided at suitable points with drainage-pipes.

The main object of my invention is to secure a better surface for that portion of the artificial stone which is ultimately presented to view and to secure a stone having substantially uniform qualities throughout.

Artificial stone as commonly cast at the present day is either cast in a mold of absorbent material, such as sand, in which case moisture from the stone is absorbed through the sand, or in a mold of substantially non-porous material, such as cement or the like, in which there is no drainage for the free water, the same being carried off by evaporation only. To the former form of mold there are two objections. First, the granular material employed does not give as true a surface or finish to the stone as is desired, and, second, the drainage through the bottom of the mold causes an inequality throughout the stone when finished, while stone produced in the latter form of mold is not of as good a quality as is desired, and such a mold is very expensive to make. Again, the mold formed of granular material is very easily injured or destroyed in handling, any fine or intricate pattern rendering the mold extremely delicate. While this fragility is obviated in the second form of mold, the expense thereof renders it impracticable for commercial purposes. In my present invention I have overcome the defects of both forms of mold referred to, in that the mold is simple and inexpensive to make and produces a stone fulfilling the most rigid requirements.

The plastic material which I have so far employed for the mold with success is clay of a proper consistency, and the particular form of clay is preferably kaolin. In forming the mold I insert a pattern with its face downward and insert drainage-tubes connecting with the ends thereof. The drainage-tubes may conveniently be pipes or tubes covered, if desired, with a mesh in order to protect the ends thereof and, further, if desired, filled with a cellular, tubular, fibrous, or granular material.

In order that my invention may be fully understood, I will now proceed to describe an embodiment thereof and will then point out the novel features in claims.

Figure 2:
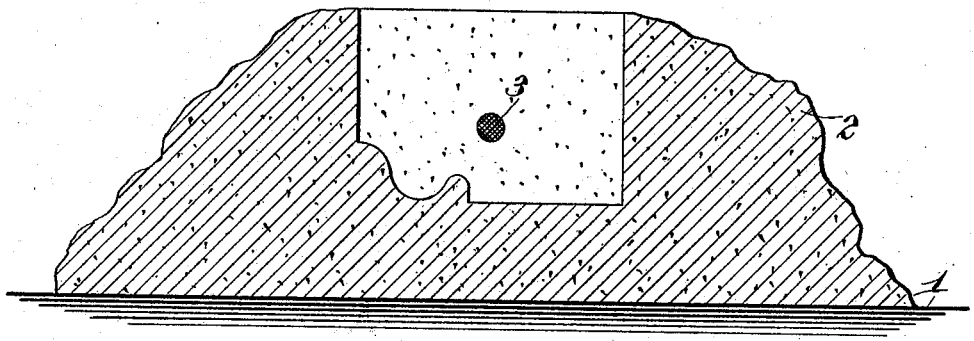
Figure 3:
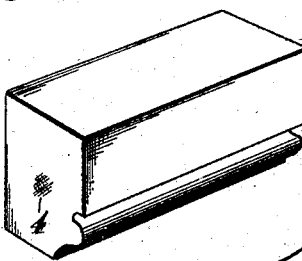

In the drawings, Figure 1 is a view in central vertical longitudinal section through a mold embodying my invention. Fig. 2 is a view in central vertical transverse section therethrough. Fig. 3 is a view in perspective of an artificial stone cast in the mold illustrated in the previous figures.

A lump of plastic material, such as clay, is placed upon a surface 1, the clay being designated by the reference character 2. A pattern of the suitable size and shape is then pressed into the clay or the clay otherwise formed around same, the pattern being arranged with its face, corresponding to that face of the finished artificial stone which is to be exposed, downward. Drainage-tubes 3 are inserted, their ends opening into the cavity formed by the pattern, a piece of fabric or other mesh 3 being provided at the end of the said drainage-tubes, if desired, as shown. The pattern is now removed and the mold is then ready to receive the material of which the artificial stone is to be made. A clay mold thus formed is very strong, and, should it be accidentally injured, may easily be repaired. To repair a sand mold of any intricacy is next to impossible, as is well understood. The stone material in a suitable plastic condition is inserted in the cavity in the mold, the said cavity being usually entirely filled. This material, which is a form of concrete or cement, has more or less free water therein in excess of the water which will be taken up or chemically combined in order to "set" the material. The lateral drainage-tubes 3 will carry away this excess of free water, but will carry it away gradually, because connected as they are endwise and laterally of the casting the moisture will pass out from the lower portion thereof by capillary attraction only. The result is a great uniformity throughout the finished stone. Further, the face of the finished stone will be smooth and of an approved finish, owing to the smoothness of the clay, any marks or blemishes, such as at 4, Fig. 3, caused by the drainage being at the end of the stone, where they will not be seen when the stone is in place.

Any suitable plastic material substantially impervious to water may be employed for the mold within the scope of my invention; but so far I have found clays to be the most satisfactory, the preferred material being kaolin.

The drainage-tubes may be filled up with absorbent material, such as mineral wool, granular material, or any desired substance such as will act to carry away moisture by capillary attraction, such substance being indicated at 5 in the drawings.

What I claim is—

1. A mold for artificial stone, composed of plastic material, substantially impervious to water, and provided with means for draining the mold-cavity.

2. A mold for artificial stone, composed of plastic material, substantially impervious to water, and provided with means for draining the mold-cavity through the end walls thereof.

3. A mold for artificial stone, composed of plastic material, substantially impervious to water, and provided with laterally-arranged drainage-tubes communicating with the mold-cavity through the end walls thereof.

4. A mold for artificial stone, composed of plastic material, substantially impervious to water, and provided with laterally-arranged drainage-tubes communicating with the mold-cavity through the end walls thereof, said tubes provided with a mesh at their inner ends.

5. A mold for artificial stone, composed of clay, and provided with drainage means connecting with the mold-cavity at points above the bottom thereof.

6. A mold for artificial stone, composed of kaolin, and provided with drainage means connecting with the mold-cavity at points above the bottom thereof.

JAMES M. HUTCHINSON.

Witnesses:
   D. HOWARD HAYWOOD,
   C. F. CARRINGTON.